(No Model.) 4 Sheets—Sheet 2.
A. EASTHOPE.
VELOCIPEDE.
No. 423,471. Patented Mar. 18, 1890.
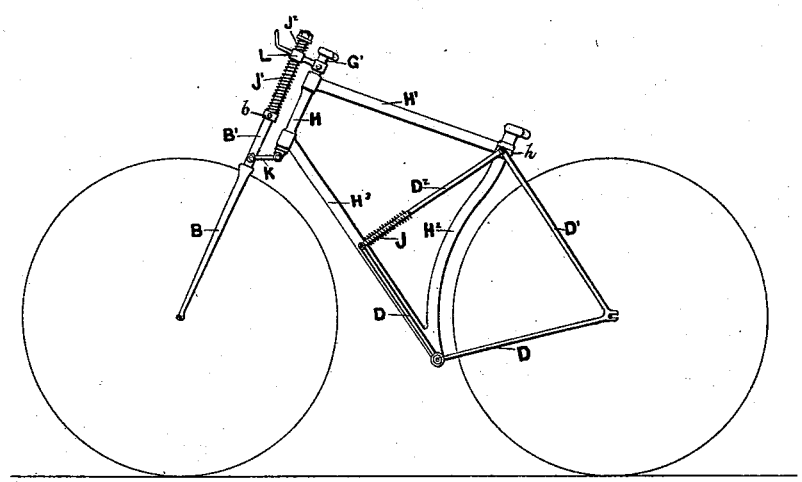
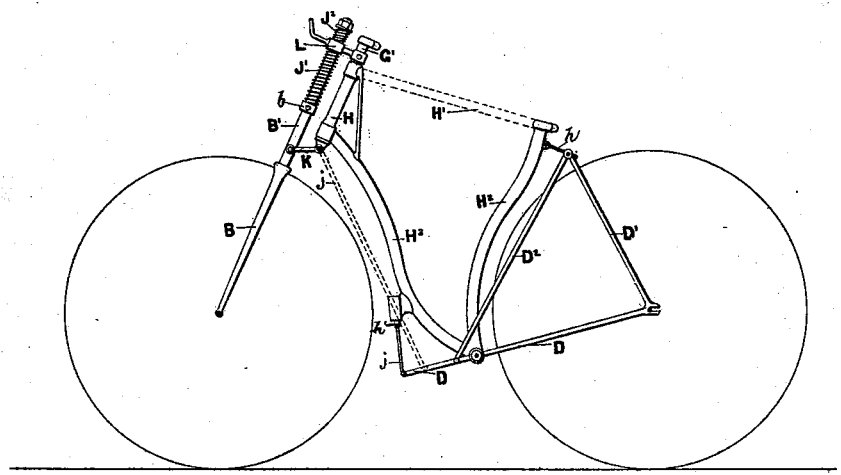
WITNESSES:
Arthur M. Flack.
Edward L. Hammond.
INVENTOR.
Alfred Easthope.
By his Attorney.

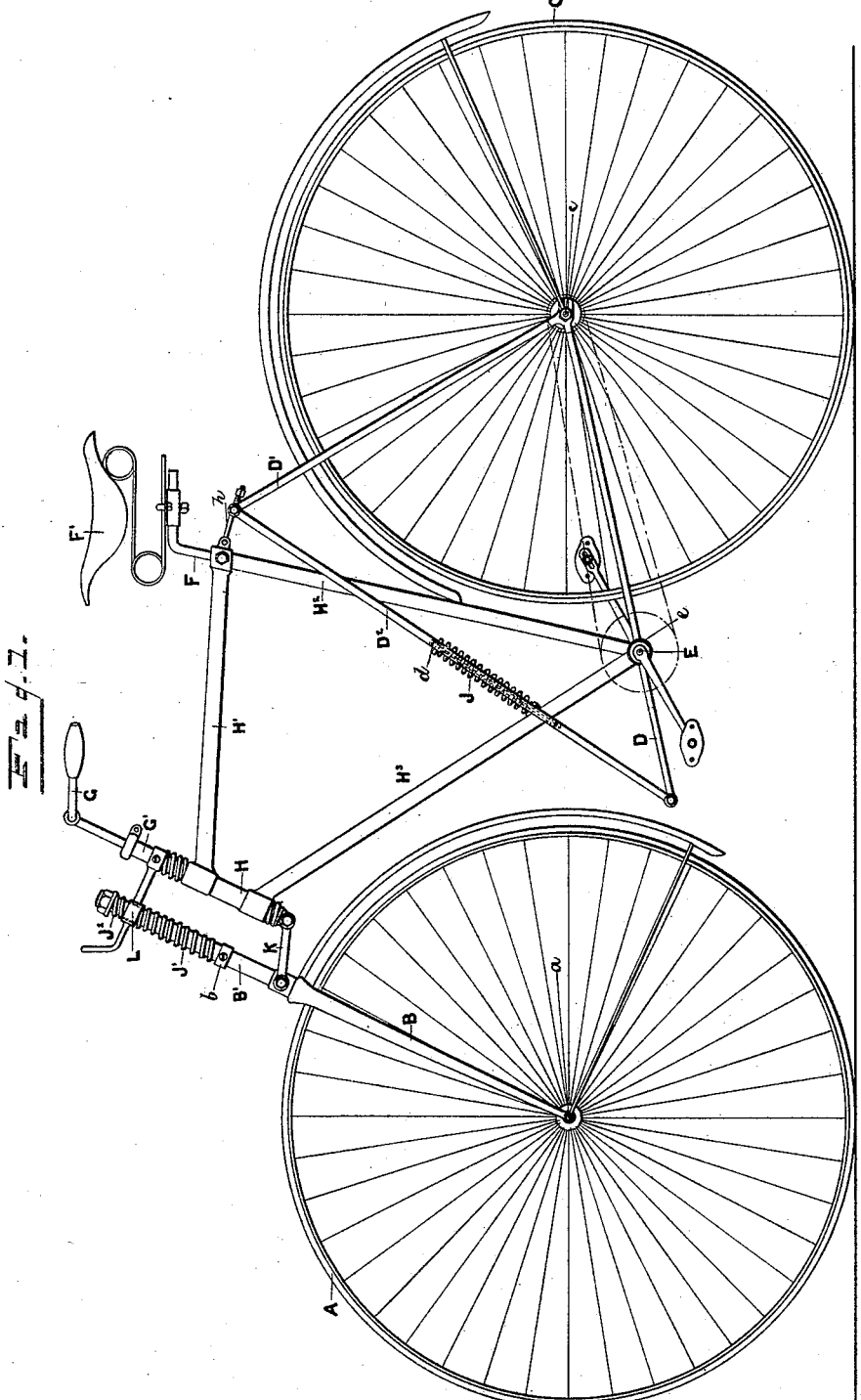

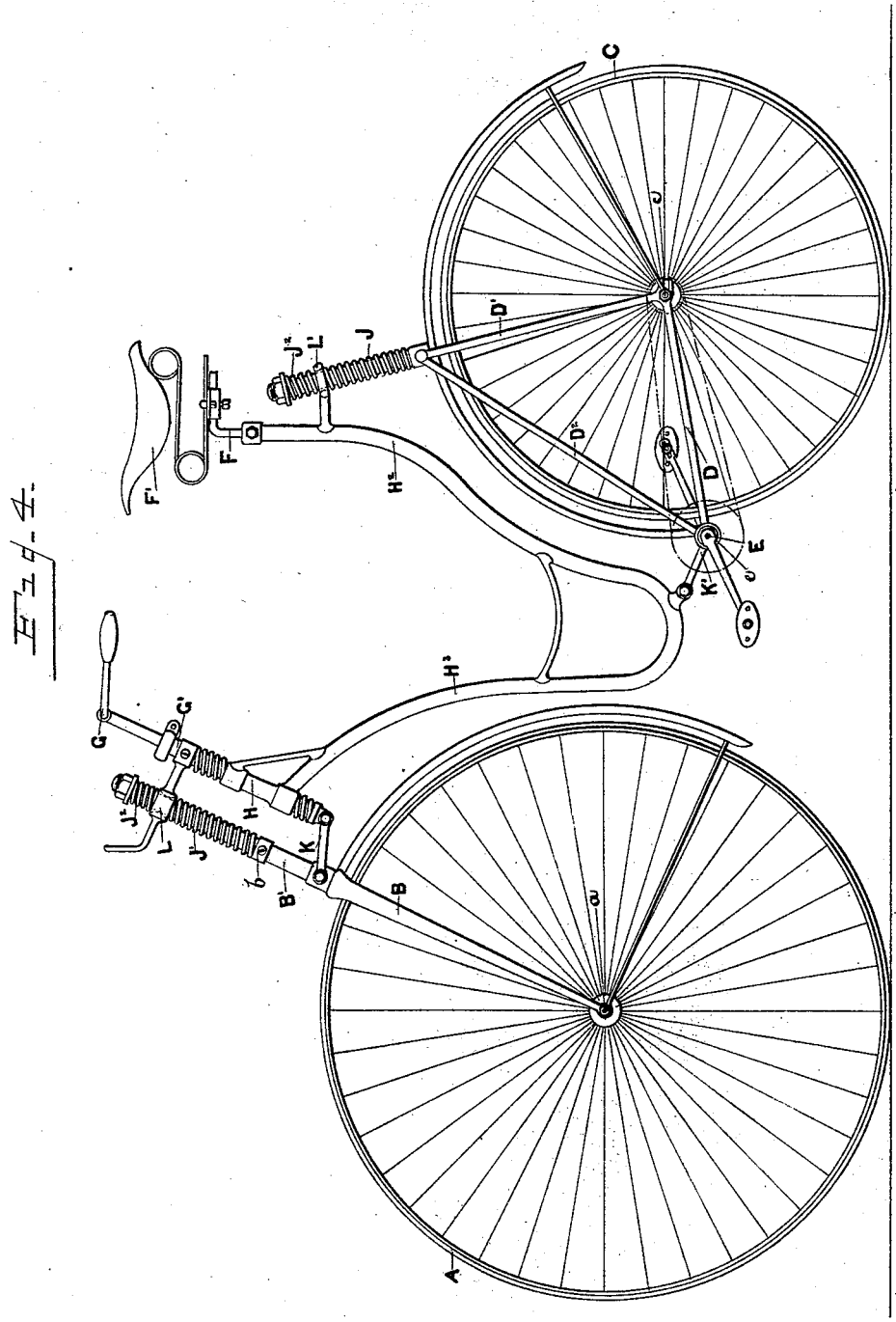

(No Model.) 4 Sheets—Sheet 4.
A. EASTHOPE.
VELOCIPEDE.
No. 423,471. Patented Mar. 18, 1890.
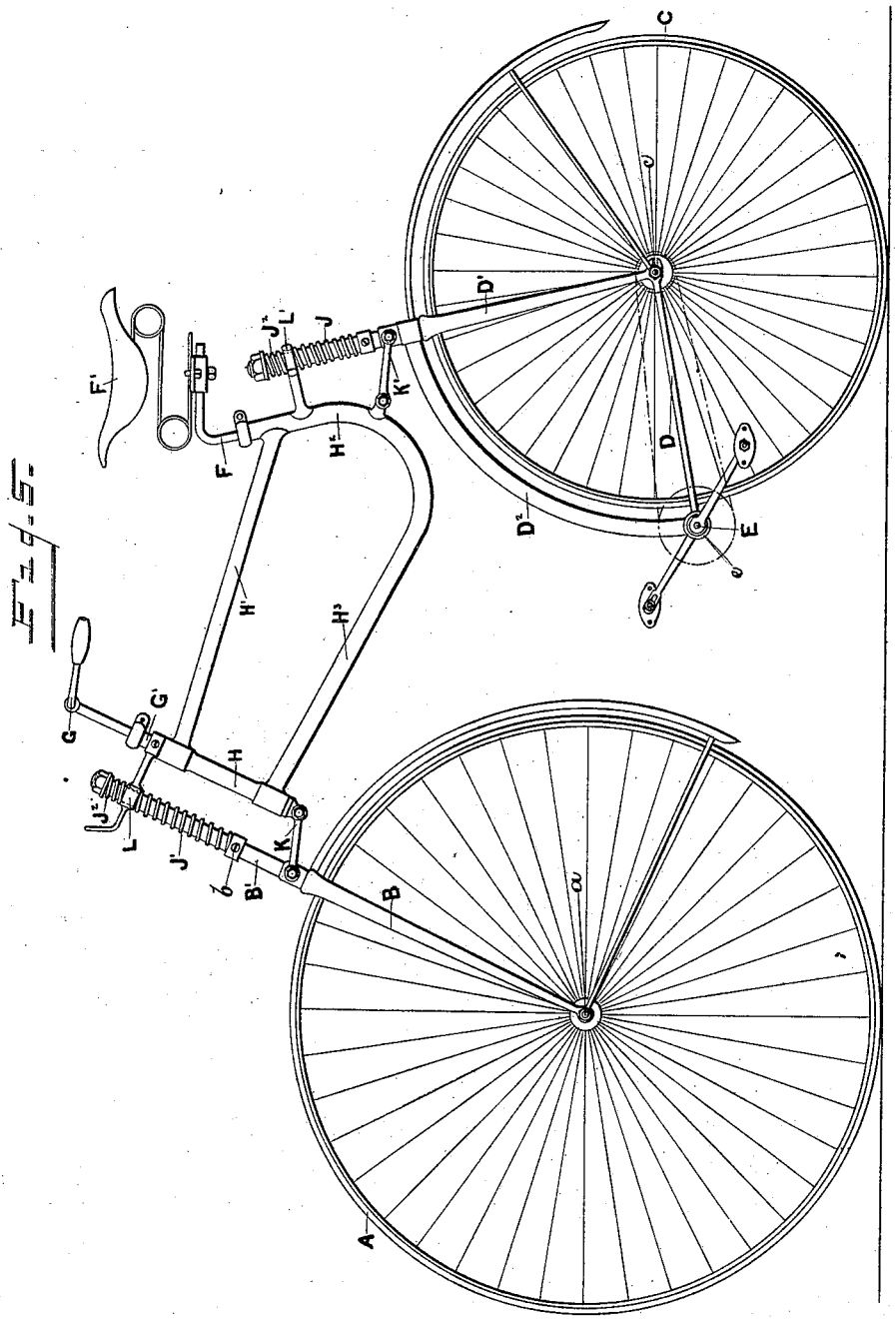
WITNESSES:
Arthur M. Flack.
Edward C. Hammond
INVENTOR.
Alfred Easthope.
By his Attorney.
Robt. &d. Phillips

UNITED STATES PATENT OFFICE.

ALFRED EASTHOPE, OF WOLVERHAMPTON, COUNTY OF STAFFORD, ENGLAND.

VELOCIPEDE.

SPECIFICATION forming part of Letters Patent No. 423,471, dated March 18, 1890.

Application filed October 16, 1889. Serial No. 327,231. (No model.)

*To all whom it may concern:*

Be it known that I, ALFRED EASTHOPE, a subject of the Queen of Great Britain, residing at Wolverhampton, in the county of Stafford, England, have invented a new and useful Improvement in Velocipedes, of which the following is a specification.

My invention relates to improvements in the frames of bicycles, tricycles, and other velocipedes; and it consists in forming the frame in three parts, one of which carries the steering wheel or wheels, another the driving wheel or wheels and the pedal crank-axle, and the third part the seat or saddle and steering head or joint and the transverse handle-bar for the rider, and of elastically connecting these parts together, so that they move with respect the one to the other, the object being the reduction of vibration and the isolation of the rider therefrom. I attain this object in the manner illustrated in the accompanying drawings, in which—

Figure 1, Sheet No. 1, is a view in side elevation of a rear-driving bicycle, the frame of which is constructed according to my invention. Figs. 2 and 3, Sheet No. 2, are diagram views of modifications in the construction and arrangement of the parts of the frame. Fig. 4, Sheet No. 3, and Fig. 5, Sheet No. 4, are views in side elevation of rear-driving bicycles, illustrating further modifications in the construction of the spring-frame.

Like parts are denoted by similar letters of reference through the several views.

The steering wheel or wheels A is or are mounted on an axle $a$, carried by a fork or its equivalent B, extending upward in the form of a tubular post B'. (B and B' form one of the three parts of the frame of the machine.) The driving wheel or wheels C is or are mounted on an axle $c$, carried by a triangular or equivalent shaped frame D D' D², each side of which consists, preferably, of double members. The side D carries the bearings $e$ for the pedal crank-axle E. The side D' runs from the axle $c$ of the driving wheel or wheels to a point beyond the periphery thereof under the seat or saddle. From this point the side D² runs to join the side D at a point in advance of the pedal crank-axle E. (D, D', and D² form another of the three parts of the frame.) The saddle F' and the transverse steering handle-bar G are carried by a quadrilateral or approximate shaped frame H H' H² H³, each side of which consists of a single tube.

The side H of the frame is adapted to form the steering socket or head to receive the steering-pillar G', carrying the transverse steering handle-bar G. The side H' runs horizontally rearward to carry the pillar F for the saddle F'. The side H² runs from this point to the pedal crank-axle E, and the side H³ runs from the pedal crank-axle E to the bottom of the side H. (H, H', H², and H³ form the third part of the frame.)

The frame H, H', H², and H³ is pivoted to the frame D D' D² at or about the pedal crank-axle E by any suitable form or joint, so that they may rock with respect to each other at or about the pedal crank-axle. The object of pivoting these two parts of the frame together at or about the pedal crank-axle is that the relative positions of the handle-bar, saddle, and pedal crank-axle shall not alter under the movements of the several parts of the frame.

To prevent undue wear on the pivoting joint and to make the two parts of the frame transversely rigid, the apex of the frame D D' D² is adapted to slide on the frame H H' H² H³ at or near the junction of the two sides H' and H², as illustrated by Fig. 2, or on a guide-bar $h$, carried thereby, as illustrated by Fig. 1.

To control the movement of the two parts of the frame D D' D² and H H' H² H³ with respect to one another, a spring J is interposed in any convenient position, either as shown by Figs. 1 and 2, where the spring J is acting in compression between the side H³ of the one part of the frame and a cross-bar $d$ between the two members of the side D² of the other part of the frame, or as shown by Fig. 3, where the spring is inclosed in a box $h$, carried by the side H³ of the one part of the frame, and is compressed by a piston $h'$, connected by a coupling-rod $j$ with the end of the side D of the other part of the frame. As a further modification, the spring J may be adapted to act in tension between the end of the side D and any convenient part of the side H³. It is not essential that the side D² of the triangular frame join the side D at the extreme end thereof, or that the end of the side D beyond the bearing of the pedal crank-axle shall be continued in the same plane, as both these points may be modified, as shown by Figs. 2 and 3, either for convenience in construction or for simplicity of design.

The part B B' of the frame is connected to the part H H' H² H³ by means of a link K or its equivalent, pivoted to the post B' close to the crown of the fork B and to the lower end of the steering-pillar G', carried by the frame H H' H² H³. The upper end of the post B' is adapted to slide through a socket L, either with or without a rocking bearing, carried by the steering-pillar G'. The movement of the part B B' is controlled by a spring J', encircling the post B' and acting in compression between a collar or shoulder $b$, formed on or fixed to the said post, and the socket carried by the steering-pillar.

A check-spring J² is placed above the socket L, as illustrated, to prevent noise and rattle.

If desired, springs may be placed on the steering-pillar G' above and below the steering-socket H, as illustrated by Figs. 1 and 4; but this forms no part of my invention.

Instead of placing the link K at the bottom and the socket L at the top, the position of these two parts may be reversed with equal effect.

By connecting the forward end of the member D of the part D D' D² of the frame with the lower end of the steering-pillar G' at its point of attachment to the link K by means of a link or its equivalent, as illustrated by dotted lines in Fig. 3, Sheet No. 2, the spring J' can be dispensed with, the spring J' controlling the entire movements of the several parts of the frame. The link $j$ would be connected to the steering-pillar by a ball-and-socket joint.

As a modification the part D D' D² of the frame may be connected to the part H H' H² H³ by means of a link K' and sliding socket L' in a similar manner to the part B B' of the frame, as illustrated by Figs. 4 and 5. In the frame shown by Fig. 4 the link K' is connected to the part D D' D² of the frame at or about the pedal crank-axle E, the part H H' H² H³ of the frame being shaped to adapt the machine to the use of ladies. In the frame shown by Fig. 5 the link K' is connected to the part D D' D² of the frame at or about the connection of the two sides D and D² of the said frame, in which case the side D² is made of a single member, as illustrated. The post D³ forms an extension of the side or fork D' and is adapted to slide through a socket L', either with or without a rocking bearing, carried by the side H², and is fitted with springs J and J², as illustrated.

Those parts which have not been hereinbefore particularly described, or which are not fully illustrated in the drawings, present no novel features and may be of the usual type and construction.

My improved spring-frame, although hereinbefore more particularly described and illustrated by the accompanying drawings as applied to a rear-driving safety-bicycle, is equally applicable to all types of tricycles. By this construction of frame the weight of the rider is carried or suspended between the steering and driving wheel or wheels on springs, and either wheel or wheels can rise to pass over obstacles without appreciably lifting the other part or parts of the frame.

I wish it to be particularly understood that I do not limit myself to the precise details of construction hereinbefore set forth, but hold myself at liberty to make such changes and alterations as fairly fall within the spirit and scope of my invention; but What I do claim as my invention, and desire to secure by Letters Patent, is—

In a velocipede, the combination, with the central rigid frame supporting the saddle and handle-bar, of a front rigid frame for the front wheel, the pivoted link K, and the spring J', interposed between the two said frames, a rear rigid frame for the hind wheel, and the pivoted link $h$ and the spring J, interposed between the said central and rear frames, whereby the central frame may vibrate vertically between the said front and rear frames, substantially as and for the purpose set forth.

In witness whereof I have hereunto signed my name in the presence of two subscribing witnesses.

ALFRED EASTHOPE.

Witnesses:
JOHN WILLIAM EASTHOPE,
*Shrewsbury,*
WILLIAM HENRY IDIENS.